United States Patent [19]

Kaczmarek

[11] 3,709,514

[45] Jan. 9, 1973

[54] FOLDABLE GOLF CART

[76] Inventor: Thomas S. Kaczmarek, 203 Bernice Street, Pittsburgh, Pa. 15237

[22] Filed: Aug. 12, 1971

[21] Appl. No.: 171,208

[52] U.S. Cl. ..........................280/41 C, 280/DIG. 6
[51] Int. Cl. ..........................B62b 1/12, B62b 1/26
[58] Field of Search .........280/36 R, 36 C, 38, 47.24, 280/47.26, DIG. 6, 41 C, 41 R

[56] References Cited

UNITED STATES PATENTS

| 2,791,436 | 5/1957 | Wuerthner | 280/38 |
| 3,079,166 | 2/1963 | Abgarian | 280/47.26 |

FOREIGN PATENTS OR APPLICATIONS

| 680,052 | 7/1951 | Great Britain | 280/DIG. 6 |
| 692,700 | 6/1953 | Great Britain | 280/DIG. 6 |

Primary Examiner—Leo Friaglia
Assistant Examiner—R. Eisenzopf
Attorney—Brown, Murray, Flick & Peckham

[57] ABSTRACT

A golf cart of the collapsible or foldable type embodying a handle for pulling the cart when in use; and which handle is operable as a lever in conjunction with a pair of inverted U-shaped frames having top transverse members and vertical side portions to which the transverse members spaced portions of the handle are pivotally mounted, so that in the upright or use position of the handle the wheels on which the cart are mounted are in a lowermost position. In the lowered or non-use position of the handle, the wheels are raised by one of the frame members to a collapsed or non-use position of the cart; there being a fabric bag having transversely spaced vertical pocket means for receiving golf clubs depending from the upper end of the bag and extending between the wheels; there being a foldable seat member adapted for use on the side of the frame opposite that of the wheels which seat member is likewise foldable into a collapsed position against the frame, and there being manually operated latch means associated with the handle and the transverse members for retaining the handle in the upright position.

8 Claims, 6 Drawing Figures

PATENTED JAN 9 1973

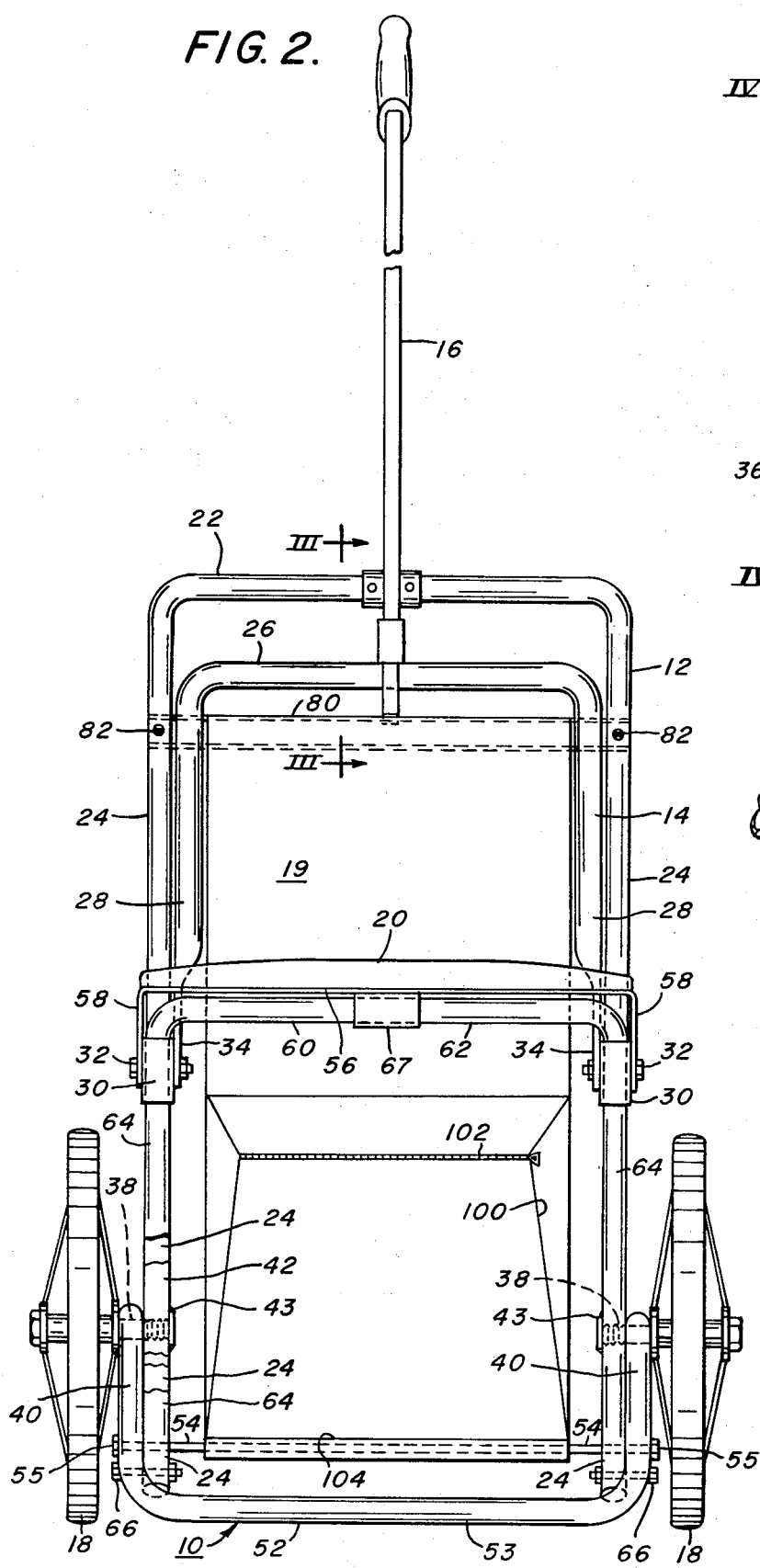
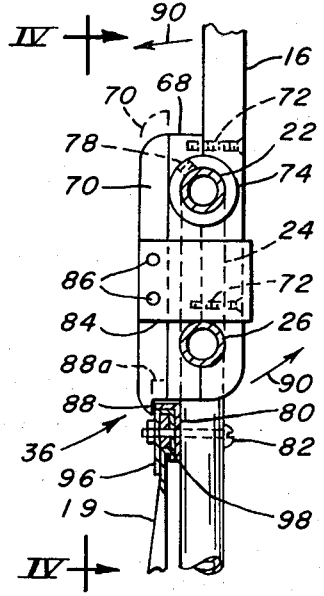
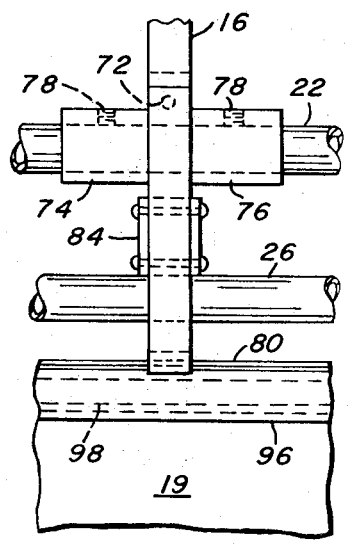

FOLDABLE GOLF CART

BACKGROUND OF THE INVENTION

1. Field of the Invention

This invention relates to a hand-pulled collapsible cart for transporting golf clubs and other golf equipment over a golf course and more particularly the invention pertains to a foldable golf cart which can be conveniently packed for shipment and storage.

2. Description of the Prior Art

Golf carts of prior construction have often included undesirable characteristics that are more inconvenient than useful. A disadvantage of many golf carts has been their high center of gravity which combined with a three-point base have often caused the carts to overturn particularly on uneven terrain. These disadvantages together with such shortcomings as awkwardness and ability to easily fold are the cause of displeasure to the golfer.

SUMMARY OF THE INVENTION

It has been found that in accordance with this invention the foregoing problems may be overcome by providing a foldable golf cart comprising a pair of inverted U-shaped frames having transverse cross portions and vertical side arms, a handle pivotally mounted on the transverse cross portions for raising and lowering one of the frames with respect to the other, the side arms of the vertically movable frame being shorter than the arms of the other frame and being slideably attached to the arms of the other frame and movable with respect thereto between upper and lower positions, a pair of wheels mounted externally of the frame having the longer arms, means mounting the wheels are provided on opposite sides of the frame which means include a link extending between the lower end of each shorter arm to a stud shaft of the wheel, said means also including a U-shaped stand with an intermediate portion and spaced arms which arms are attached at their extremities to the stud shaft of the corresponding wheel, the intermediate portion of the U-shaped stand being engageable with the ground when the cart is in the unfolded and use position, a foldable seat pivotally mounted on the side of the frame opposite the wheels and the seat including mounting members pivotally attached to the lower end of the frame member having the shorter arms as well as to the spaced arms of the U-shaped stand, manually releasable latch means mounted on the end of the handle and adjacent to the transverse cross members of the frame members, whereby upon release of the latch means the handle may be lowered from an upright to a lower position in order to raise the wheels upwardly to a compact position with the frames and fold the seat upwardly against the frame, and fabric pocket means for receiving golf clubs and other golfers' paraphernalia (hereinafter called golf clubs) attached to and depending from the upper end portions of the side arms of one of the frame members and depending along the frame members and between the wheels.

BRIEF DESCRIPTION OF THE DRAWINGS

FIG. 2 is a rear elevational view of the cart showing the rear portion of the golfer's canvas bag mounted between the frame members;

FIG. 3 is an enlarged fragmentary sectional view, taken on the line III—III of FIG. 2;

FIG. 4 is an elevational view, taken on the line IV—IV of FIG. 3;

DESCRIPTION OF THE PREFERRED EMBODIMENT

Figure 1:
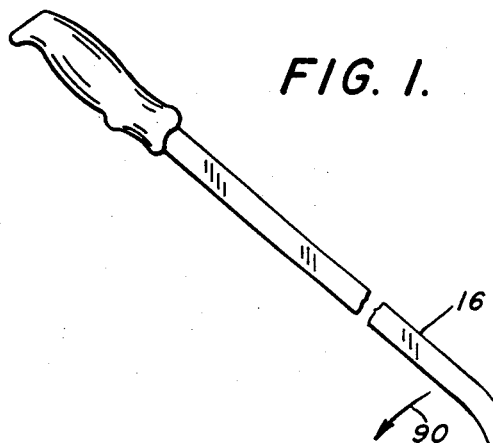
FIG. 1 is a side elevational view of the cart in the unfolded position with a golfer's bag for carrying clubs and other paraphernalia omitted for clarity, and showing in broken line positions of the various parts in the folded position.
Figure 6:
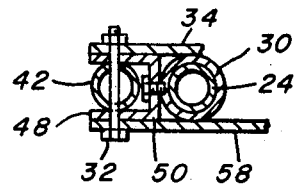
FIG. 6 is a sectional view taken on the line VI—VI of FIG. 1.

A golf cart is generally indicated at 10 in FIGS. 1 and 2 and it includes a main frame 12, a wheel frame 14, a handle 16, a pair of wheels 18, a bag 19, and a foldable seat 20. The main frame 12 is an inverted U-shaped member having a top crosshead 22 and similar vertical arms 24 which arms extend almost to the ground. Likewise, the wheel frame 14 includes a top crosshead 26 and a pair of vertical arms 28, and the lower end portions are flattened and curved forwardly at 34 and pivotally attached to slide means such as sleeves 30 by nut and bolt assemblies 32 (FIG. 6). The frames 12 and 14 are composed preferably of tubular members of a metallic material such as aluminum.

As shown in FIG. 1, the handle 16 extends upwardly and forwardly of the frames 12 and 14. The lower end of the handle (as viewed in FIG. 3) is pivotally attached to the top crosshead 22 and to the top crosshead 26. Briefly, as shown in FIG. 1, the handle 16 serves as a lever for folding the golf cart into a compact folded assembly by releasing a latch generally indicated at 36 and moving the handle downwardly around the crosshead 22 to a lowermost (broken-line) position 16a, whereby the wheel frame 14 is moved upwardly from a position below the top crosshead 22. As the handle is lowered, the vertical arms 28 pull the sleeves 30 (FIG. 2) upwardly to a higher position on the vertical arms 24 as shown by the broken line position 30a.

As shown in the drawings, the pair of wheels 18 is mounted forwardly and externally of the main frame 12 on stud shaft 38 which extends through a tubular link or arm 40 and a link 42 (FIGS. 1 and 2). The stud shafts 38 are secured to the links 42 (such as by a weld 43) and are pivotally attached to the arms 40. Since link 42 is aligned with arms 24 and 64 for clarity in FIG. 2, a portion of left arms 24 and 64 are broken away to show the inner end of the stud shaft extending through the link 42.

As shown in FIG. 6 for one of the links 42, the upper end of the link is pivotally mounted by a bolt 32 in a bracket 48 which is suitably attached such as by a bolt 50 to the sleeve 30.

The arm 40 (FIG. 1) is inclined downwardly at an angle from the stud shaft 38 and its lower end 52 rests upon the terrain when the cart is unfolded and in the upright position. As shown in FIG. 2 the arms 40 are integral portions of a U-shaped member having a crosshead 53. The lower ends of the vertical arms 24 of the main frame 12 are pivotally attached to a horizontal rod 54 (FIG. 2) having end bolts 55.

The foldable seat 20 is substantially horizontally disposed (FIGS. 1 and 2) and is supported by a channel member 56 having downturned end flanges 58 (FIG. 2). The front end portions of the flanges 58 are pivotally mounted by the bolts 32 to the bracket 48 (FIG. 6). Support means for the foldable seat are provided such as an inverted U-shaped seat frame 60 with an intermediate cross member 62 and downturned side arms 64, the lower end of which are pivotally attached by bolts 66 to the links 40. The intermediate cross member 62 of the inverted U-shaped seat frame is secured in place to the undersurface of the seat channel member 56 by a bracket 67 in which the cross member 62 is rotatably mounted.

The latch generally indicated at 36 is shown more particularly in FIGS. 3 and 4. It includes a pair of blocks 68 and 70 which block 68 is secured to the handle 16 by a pair of similar spaced screws 72 for attachment to the crossheads 22 and 26. The block 68 and the handle 16 have arcuate grooves to receive the crossheads; that is, the block and handle fit around the crossheads and the surface contact between them is sufficiently loose to permit rotation of the handle 16 in the manner described above. To prevent lateral shifting of the handle 16 with respect to the crossheads, a pair of similar collars 74 and 76 (FIG. 4) are mounted on the crosshead 22 by set screws 78. The lower edge of the block 68 is disposed slightly above the upper edge of a transverse channel 80 which, as shown in FIG. 2, extends between the vertical arms 24 to which the ends of the channel member are secured by bolts 82.

The block 70 is retained in place against the block 68 by a U-shaped bracket 84 to which it is attached by spaced bolts or rivets 86 and the bracket is movable vertically with respect to the block 68. The lower end of the block 70 includes a projection or catch 88 which, when the block is in the lowermost position as shown in FIG. 3, extends below the upper end of the channel member 80 and thereby prevents rotation of the handle counterclockwise in the direction of the arrow 90 as when the cart is collapsed or folded. To disengage the latch, the block 70 is raised so that the catch 88 (in the broken line position 88a) is clear of the channel member 80 and thereby enable rotation of the handle 16 counterclockwise in the direction of the arrow 90.

Upon complete rotation of the handle 16 to the position 16a (FIG. 1), the several parts including the wheel frame 14, the seat 20, the wheels 18 as well as their support members including the arm 40 and link 42 are shifted to their respective broken line positions as shown in FIG. 1, thereby providing a folded and compact golf cart.

Figure 5:
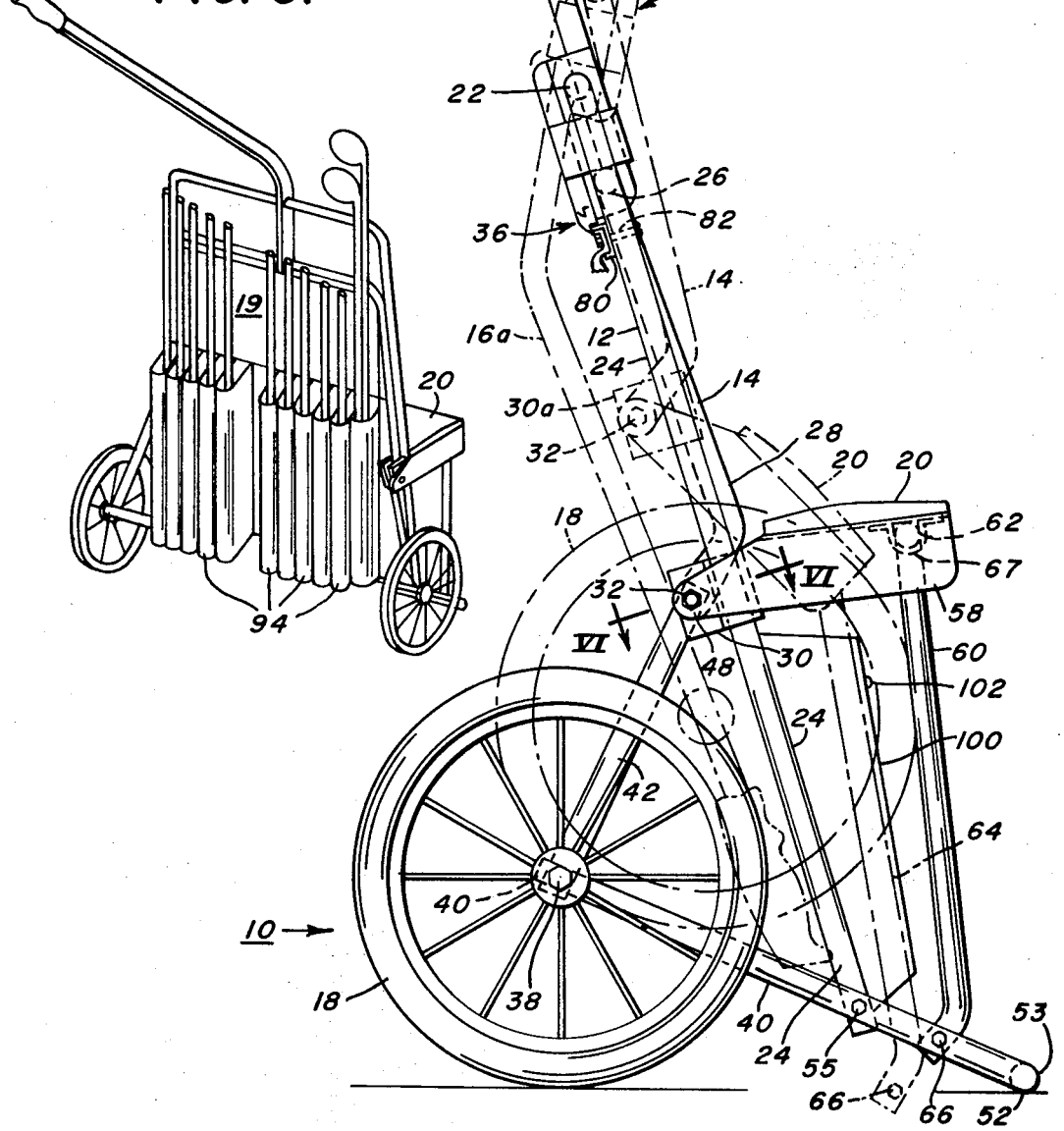
FIG. 5 is a perspective view of the front portion of the golf cart in the unfolded position and showing the manner in which a golfer's canvas bag is disposed between the frame members.

As shown in FIG. 5, the bag 19 for carrying golf clubs and other paraphernalia is attached to the cart 10 between the vertical arms 24 and 28. The bag 19 is composed of a flexible material such as a fabric with a series of double-faced pockets 94 which pockets extend across the front side of the vertical sheet portion of the bag 19 and which pockets are vertically disposed to receive golf clubs of which only a few are shown in broken line for clarity. The upper end of the bag 19 includes a hem 96 for holding the bag in place such as by a retaining bar 98 (FIGS. 3 and 4) which bar is coextensive with the channel member 80 and is mounted by the bolts 82.

As shown in FIG. 2, the rear side of the bar 19 includes any combination of pockets and openings such as a pocket or pouch 100 which is located under the seat 20 and for easy access to the pocket a zippered opening 102 may be provided. In FIG. 1 only the pouch or pocket 100 of the canvas bag 19 is shown and the remainder of the bag is omitted for clarity.

In addition, the lower edge of the bag 19 includes a similar hem 104 (FIG. 2). The rod 54 extends through the hem 104 and retains the bag 19 tautly in place between the vertical arms 24 and 28 of the main and wheel frames 12 and 14, which position is sustained in the folded or unfolded position of the cart.

Accordingly, the device of the present invention provides a foldable golf cart which in the unfolded position has a lower center of gravity, widely spaced wheels, and a ground rest or stand (crosshead 53) having a line contact with the terrain or ground which provides a more stable golf cart than most carts of the prior art.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A foldable golf cart comprising a main frame and a wheel frame, both frames having inverted U-shapes and including top crossheads and vertical arms, a handle extending forwardly of the cart and having a rear end portion rotatably attached at spaced locations to the top crossheads, whereby the handle is manually movable in a plane normal to the planes of the frames and between upper and lower handle positions with the wheel frame being movable vertically with respect to the main frame in the opposite direction of the handle movement, manually releasable latch means for latching the handle to the main frame when the handle is in the upper position, slide means for mounting the lower ends of the arms of the wheel frame on the corresponding arms of the main frame, a pair of wheels mounted forwardly of the lower end portions of the arms of the main frame, means for mounting each wheel on each of the arms and including a stud shaft and first and second links, the first link being attached at one end to the stud shaft and at the other end to the slide means on the corresponding arm of the main frame, the second link having one end attached to the stud shaft at one end and being pivotally attached to the lower end of the said arm, and pocket means for receiving golf clubs depending from the main frame and extending downwardly between the wheels.

2. The foldable golf cart of claim 1 wherein the wheel frame is nested within the main frame with the top crosshead and vertical arms in substantial planar alignment with the main frame when the handle is upright.

3. The foldable golf cart of claim 1 wherein the top crosshead and vertical arms of the wheel frame are non-aligned with the main frame and the top crosshead thereof is above the crosshead of the main frame when the handle is down.

4. The foldable golf cart of claim 1 wherein the latch means includes a latch bar and a manually releasable catch, the latch bar being disposed between the vertical arms of the main frame and the catch being movably mounted on the handle for releasable engagement with the latch bar.

5. The foldable golf cart of claim 4 wherein the catch is slideably mounted on the handle.

6. The foldable golf cart of claim 1 wherein a seat is mounted on the main frame on the side opposite the fabric pocket means, and support means for simultaneously moving the seat between a horizontal position and a folded position against the frame respectively upon raising and lowering the handle.

7. The foldable golf cart of claim 6 wherein the support means includes seat mounting brackets on each end of the seat which brackets are pivotally mounted on corresponding slide means on the vertical arms of the main frame, and which support means includes an inverted U-shaped frame having a crosspiece extending across and pivotally secured to the seat undersurface and having side portions with lower ends pivotally secured to the second link.

8. A foldable golf cart comprising a main frame having an inverted U-shape including a top crosshead and depending sides, a wheel frame having an inverted U-shape including a top transverse segment and vertical arms, a sleeve slideably mounted on each depending side of the main frame, each vertical arm being pivoted to a corresponding sleeve, a pair of spaced wheels with stud shafts mounted near the lower ends of the depending sides of the main frame for supporting the cart, mounting means for each wheel on each side of the main frame and including a link and a U-shaped stand with spaced arms, each link having a lower end attached to a stud shaft and pivotally secured at the upper end to the sleeve on the corresponding side, each arm of the stand being secured to a corresponding stud shaft and being pivotally secured to the lower ends of the depending sides of the main frame, a lever-type handle for pulling the cart and having an end pivotally mounted on the transverse segment of the wheel frame, the handle also being pivoted on the crosshead of the main frame, the handle being movable between an upright position and a downward position with the sleeve being movable between lower and upper positions of the depending sides of the main frame, whereby the wheels are in lowered and elevated positions respectively when the handle is in the upright and downward positions, latch means on the handle for holding it in the upright position, and fabric pocket means for receiving golf clubs depending from an upper portion of the main frame and between the wheels.

* * * * *